Figure 1:
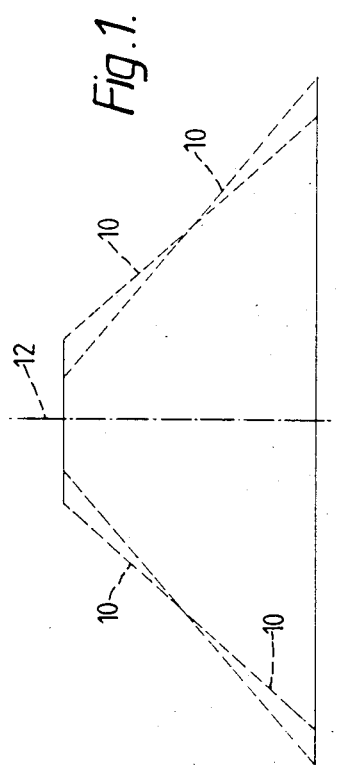

United States Patent [19]

Cameron et al.

[11] Patent Number: 4,624,527
[45] Date of Patent: Nov. 25, 1986

[54] RADIATION-UTILIZING MEASUREMENT SYSTEM

[75] Inventors: Evan S. Cameron; Linda P. Shaw, both of Edinburgh, Scotland

[73] Assignee: Ferranti, plc, Cheadle, England

[21] Appl. No.: 539,560

[22] Filed: Oct. 6, 1983

[30] Foreign Application Priority Data

Oct. 16, 1982 [GB] United Kingdom ............... 8229615

[51] Int. Cl.⁴ .............................................. G02B 26/10
[52] U.S. Cl. ........................................................ 350/6.5
[58] Field of Search .................. 350/6.5, 6.6, 6.7, 6.8, 350/433, 434, 446; 250/236

[56] References Cited

U.S. PATENT DOCUMENTS

| | | | |
|---|---|---|---|
| 3,652,150 | 3/1972 | Berreman | 350/433 |
| 3,659,922 | 5/1972 | McCrobie | 350/446 |
| 3,853,406 | 12/1974 | Zanoni | 350/6.4 |
| 4,500,200 | 2/1985 | Kleinhans | 350/446 |

FOREIGN PATENT DOCUMENTS

| | | |
|---|---|---|
| 0028160 | 6/1981 | European Pat. Off. |
| 57-814 | 5/1982 | Japan ............... 350/6.5 |
| 414730 | 8/1934 | United Kingdom |
| 1283150 | 7/1972 | United Kingdom |
| 1399701 | 7/1975 | United Kingdom |
| 1431059 | 4/1976 | United Kingdom |
| 1562635 | 3/1980 | United Kingdom |
| 2062277 | 5/1981 | United Kingdom |
| 2096789 | 10/1982 | United Kingdom ............... 350/6.5 |

OTHER PUBLICATIONS

Southall, "Mirrors, Prisms and Lenses", MacMillan Co.; New York, 1923, pp. 314-320.
Jenkins & White, "Fundamentals of Optics", McGraw Hill; New York, 1957, pp. 56-57.

Primary Examiner—John K. Corbin
Assistant Examiner—Loha Ben
Attorney, Agent, or Firm—Kerkam, Stowell, Kondracki & Clarke

[57] ABSTRACT

In a radiation-utilizing measurement system including a rotatable reflector, a point source, and a point detector, there being a plane both at right angles to the rotational axis and including the source and the detector, the plane also including the optic axis of the system extending equidistant between the source and the detector, and there being a plane including the rotational axis and the optic axis, there is provided a refracting element with zero power in the first plane, and a finite positive power in the second plane; or, at least the equivalent of, two refracting elements, the second refracting element having zero power in the second plane, and a finite positive power in the first plane. Thereby, respectively, the effects caused by reflector fluctuation; and also the effects caused by reflector rotation, when the source provides a conically divergent beam of radiation; are obviated.

5 Claims, 20 Drawing Figures

RADIATION-UTILIZING MEASUREMENT SYSTEM

This invention relates to radiation-utilising measurement systems, in particular, each such system including at least one planar, specular reflector capable of rotation or oscillation about an axis, a fixed point source of a beam of radiation, the beam being arranged to be capable of being incident upon the rotatable reflector, and at least one fixed detector of such radiation, the detector being arranged to be capable of receiving radiation after reflection by the reflector.

For convenience, in this specification and the accompanying claims, only rotation of the reflector is referred to, but such references are considered to include references to the oscillation of the reflector where appropriate.

With any arrangement for such a system either there is provided, or there can be considered to be, a point detector, and there is a plane both at right angles to the rotational axis of the reflector, and including a line extending between the point source and such a point detector. If a point detector is not provided in such a plane, the arrangement for the system is such that there can be considered to be a point detector in such a plane in one of the following ways. The point detector can be considered to be the normal projection of a provided point detector onto the plane. If a detector of a finite sensitive area is provided, which detector is intersected by the plane, the considered point detector, respectively, is the point, or the point of symmetry, of the detector within the plane. Ideally, the detector should be as small as is practicable. Alternatively, and whether the detector of a finite sensitive area is intersected by the plane, or not, the considered point detector may be the normal projection onto the plane of the point of the provided detector at which the maximum radiation intensity is detected, when the projection of the line including the source and the considered point detector onto the reflector is parallel to the line. More than one detector may be provided, the arrangement being such that; either at any instant only one detector, comprising, or considered to be, a point detector, is operable; or a point in the plane about which the provided detectors are symmetrical, or the normal projection of the symmetrical point of the provided detectors onto the plane, can be considered to be the point detector in the plane.

Further, in relation to the rotation of the reflector, only the cross-section of the reflector in the plane, at right angles to the rotational axis of the reflector, and including, the line extending between, the source and the detector, need be considered, and it is immaterial in this respect whether the reflector is inclined to the rotational axis of the reflector or not.

The combination of the source and the detector have an optic axis within the plane at right angles to the rotational axis of the reflector and including the line extending between the source and the detector, the optic axis being at right angles to the line extending between the source and the detector, and extending equidistant from the source and the detector. For convenience, hereinafter in this specification and the accompanying claims, this optic axis is referred to as the optic axis of the system. In relation to reflector rotation, the optic axis of the system intersects the reflector at what can be considered to be the axis of rotation of the reflector, irrespective of wheher the actual axis of rotation is coincident with such a point, or not.

In such a system not modified in accordance with the present invention, the rotatable reflector is likely to, or is arranged to, fluctuate about an axis considered to be in the plane at right angles to the rotational axis, and including the source and the detector. For example, the fluctuations may be because the system includes a rotatable member having a plurality of constituent reflectors distributed about the rotational axis, with different reflectors being inclined at different angles to the rotational axis, in order that the reflected portion, of the beam incident upon the reflector, sweeps generally parallel to the line including the source and the detector with a raster scanning action. In relation to such reflector fluctuation, the combination of such a plurality of reflectors is considered to be a single reflector, because, for any angular location of the rotatable member about the axis of rotation, only one constituent reflector is capable of reflecting radiation from the source to be received by the detector. Thus, hereinafter in this specification and the accompanying claims, and in association with reflector rotation, or fluctuation, a reference to a reflector includes a reference to such a rotatable member having a plurality of constituent reflectors. The optic axis of the system intersects the reflector at what can be considered to be the axis of fluctuation, irrespective of whether the actual axis of fluctuation is coincident with such a point, or not. In relation to the reflector fluctuation only the cross-section of the reflector in the plane referred to above need be considered, and it is immaterial in this respect whether the reflector is inclined to the axis of fluctuation, or not.

A system arranged in accordance with the present invention may comprise an operational system, required to perform a desired function; or it may comprise such an operational system modified for an initial calibrating mode, before being rendered capable of performing its required function.

Measurements required to be made by the system comprise indicating when the rotatable reflector is in a predetermined angular location, and relative to a datum angular location, about the rotational axis, such a predetermined angular location being when the maximum possible intensity, of the possibly varying detectable intensity, of the reflected radiation, is detected by the detector.

As indicated above, such measurements may be required for calibration purposes. Alternatively, when the system comprises an unmodified operational system, in one such arrangement, successive determinations of the predetermined angular location of the reflector, about the rotational axis, are employed to determine the speed of rotation of the reflector, possibly the system being included in apparatus having a gyroscope, the reflector being mounted on the gyroscope, and the rotational speed of the gryoscope being determined.

Because of any fluctuation of the reflector the accuracy associated with the measurements required to be made by the system is reduced, if thereby the reflected radiation is at least partially displaced from the detector.

It is an object of the present invention to provide a radiation-utilising measurement system modified in relation to the system described above, so that there is obviated the otherwise adverse effects upon the accuracy associated with the measurements required to be made by the system caused by fluctuation of the reflector.

According to the present invention a radiation-utilising measurement system including a planar, specular reflector capable of rotation about an axis, a fixed source of a beam of radiation, and a fixed point detector, the arrangement being such that the beam is capable of being incident upon the rotatable reflector, and the detector being capable of receiving radiation after reflection by the reflector, there being a plane at right angles to the rotational axis of the reflector and including the source and the detector, the plane also including the optic axis of the system extending equidistant between the source and the detector, and there being a plane including the rotational axis of the reflector and the optic axis, the system having a refracting arrangement with an optic axis coincident with the optic axis of the system, and the refracting arrangement at least includes a thin refracting element, or the equivalent thereof, having zero power in the plane both at right angles to the rotational axis and including the source and the detector, the system being arranged so that the reciprocal of the distance of the refracting element from the source, plus the reciprocal of the distance of the refracting element from the reflector, is equal to the reciprocal of the focal length of the refracting element in the plane including the rotational axis and the optic axis, in which latter plane the refracting element has a positive power.

The point source may provide a narrow collimated beam of radiation, for example, the source comprising a laser; or the point source may provide a divergent beam of radiation, say, a conically divergent beam having a section with an apex angle less then 45°. When the refracting arrangement comprises only such an element, as referred to in the preceding paragraph, the radiation from the source is focussed onto the reflector, respectively, in the form of a spot, or a line at right angles to the rotational axis; and the radiation reflected from the reflector is focussed into, respectively, a spot, or a line, at least substantially coincident with the line including the source and the detector; irrespective of any reflector fluctuation about the axis considered to be in the plane at right angles to the rotational axis, and including the source and the detector. Thus, there is obviated the otherwise reduced accuracy associated with the measurements required to be made by a system and not including such a refracting arrangement, because of reflector fluctuation.

The thin refracting element comprises, or is equivalent to, a plano-cylindrical, or a bi-cylindrical, lens with the axis, or axes, of curvature of the part-cylindrical lens surface, or surfaces, parallel to the axis of fluctuation of the reflector.

When the point source provides a conically divergent beam of radiation, unless the system is modified appropriately, as the reflector rotates, and the conically shaped beam is incident upon the reflector from the source, the reflected portion of the radiation beam sweeps at least generally along the line including the source and the detector, and the axis of the reflected portion of the beam becomes spaced along the line from the detector. The conical reflected beam portion has a substantial finite length at the line including the source and the detector, even when the apex angle of the section of the conically divergent radiation is small, and the accuracy associated with the measurements required to be made by the system, about the axis of rotation, is reduced thereby.

Conveniently, when the point source provides a conically divergent beam of radiation, the refracting arrangement also compensates for the reflected portion of the beam having a finite length along the line including the source and the detector by the refracting arrangement also including a thin refracting element, or the equivalent thereof, having zero power in the plane including the rotational axis and the optic axis, and the system is arranged so that the source is spaced from the refracting element by a distance equal to the focal length of the refracting element in the plane at right angles to the rotatinal axis and including the source and the detector, in which latter plane the refracting element has a positive power. If the refracting arrangement comprises only such an element, the conical beam is collimated thereby in the plane at right angles to the rotational axis and including the source and the detector. The collimated radiation is both incident upon, and reflected from, the reflector, and the reflected portion of the beam is focussed by the refracting element into a line at right angles to the line including the source and the detector, the line focus being capable of being coincident with the detector. As the reflector rotates, the line focus moves at least substantially along the line including the source and the detector. The effective point of rotation of the line focus is the centre of the refracting element. Thus, there is obviation for the effects otherwise causing a reduced accuracy associated with the measurements required to be made by a system not including such a refracting arrangement, because of the reflected portion of the beam having a finite length along the line including the source and the detector. The thin refracting element comprises a plano-cylindrical, or a bi-cylindrical, lens with the axis, or axes, of curvature of the part-cylindrical lens surface, parallel to the rotational axis of the reflector. However, the refracting arrangement is required to be at least the equivalent of two refracting elements. The refracting arrangement focusses the reflected portion of the beam into a spot which sweeps, at least generally, along the line including the source and the detector. For example, the refracting arrangement comprises two plano-cylindrical lenses, or bi-cylindrical lenses, with the axes of curvature of the constituent part-cylindrical surfaces of the two lenses being at right angles to each other. Two such lenses may be combined, so that the refracting arrangement is in the form of a single thin lens, with, or being equivalent to, two part-cylindrical surfaces, the axes of curvature of the two surfaces being at right angles to each other.

Further, the refracting arrangement may comprise, or be equivalent to, a plano-spherical, or bi-spherical, lens, in combination with a plano-cylindrical, or a bi-cylindrical, lens, the sum of the powers of the lenses in the pane at right angles to the rotational axis and including the source and the detector, and the sum of the powers of the lenses in the plane including the rotational axis and the optic axis, both having the required values, the cylindrical lens possibly having a negative power. Conveniently, the refracting arrangement comprises a single thin lens, with one part-spherical surface, and one part-cylindrical surface.

In any form of system with the refracting arrangement comprising, or being equivalent to, a combination of two discrete thin refracting elements, the focal length of the refracting element, or the equivalent thereof, in the plane including both the rotational axis and the optic axis, may be half the focal length of the refracting element, or the equivalent thereof, in the plane at right angles to the rotational axis and including the source and the detector, and the refracting arrangement is positioned mid-way between the source and the detector, and the reflector. Thus, the system is as compact as possible.

The area, or areas, of the provided refracting element, or elements, determine the size of the apex angle of the section of the conically divergent beam of radiation considered to be provided by the source within a system. Thus, the system may include a point source with radiation being emitted over a substantial solid angle therefrom, but, for example, only the radiation transmitted by the refracting element, or elements, in both directions, is considered to be provided.

The present invention will now be described by way of example with reference to the accompanying drawings, in which FIG. 1 is a sectional elevation of a known form for a rotatable member having a plurality of constituent reflectors inclined at different angles to the rotational axis of the member, the member being arranged so that a reflected portion of a beam sweeps with a raster scanning action, and it being considered that, as the member rotates, reflector fluctuation occurs about an axis at right angles to the rotational axis, FIG. 2 is of a known radiation-utilising measurement system having a rotatable reflector, FIG. 2 showing the arrangement of the system in a plane including the rotational axis, the illustrated plane also including the optic axis of the system, extending equidistant between a source and a detector, and at right angles to the axis of fluctuation of, say, the member of FIG. 1.

Figure 6C:
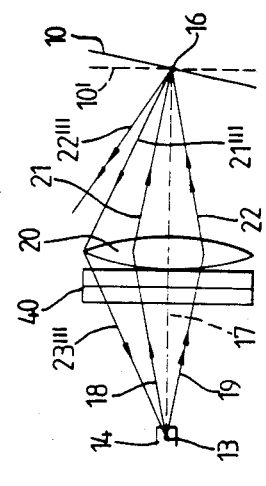
Figure 6B:
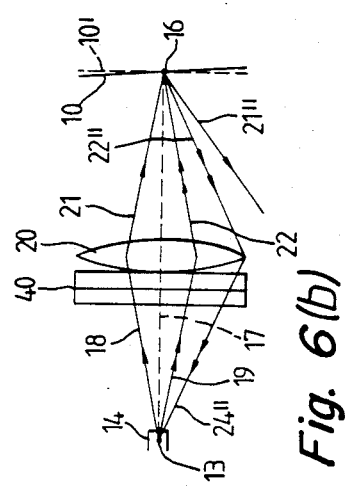
Figure 6A:
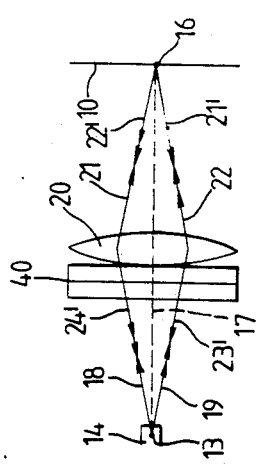
Figure 6F:
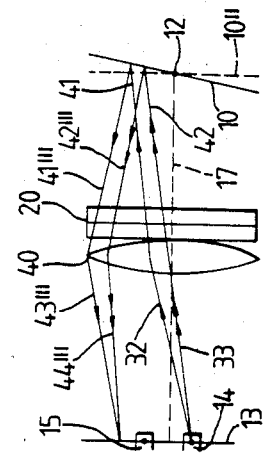
Figure 6E:
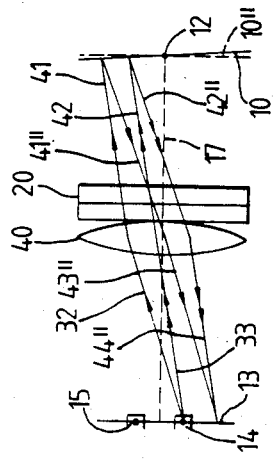
Figure 6D:
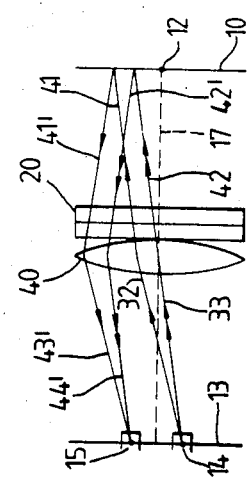
Figure 7:
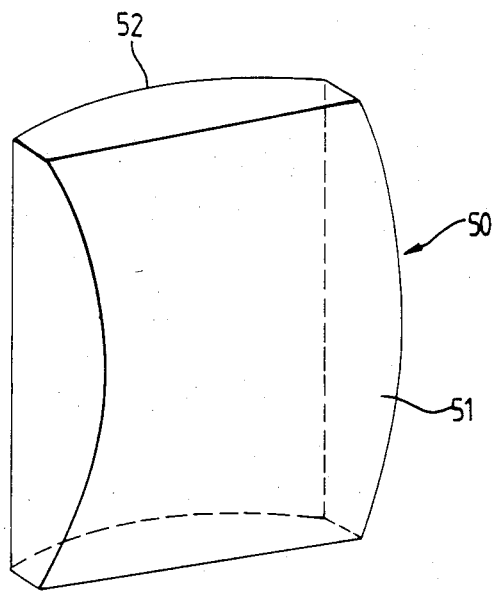

FIG. 3 shows the arrangement of FIG. 2 modified, in an embodiment of a system in accordance with the present invention, the system including a bi-cylindrical lens between the reflector, and the source and the detector, and with a finite positive power in the plane including the rotational axis of the reflector and the optic axis, FIG. 4 corresponds to FIG. 2, but shows the arrangement of a known system in a plane at right angles to the rotational axis and including the source and the detector, FIG. 5 shows the arrangement of FIG. 4 modified by including a by-cylindrical lens between the reflector and the source and the detector, and with a finite positive power in the plane at right angles to the rotational axis and including the source and the detector, FIG. 6 is of a system, comprising another embodiment in accordance with the present invention, and including the modifications of both FIGS. 3 and 5, and shows the arrangement in the plane including the rotational axis and the optic axis of the system, and in the plane at right angles to the rotational axis of the reflector and including the source and the detector, and FIG. 7 is a perspective view of a thin refracting element equivalent to the combination of the bi-cylindrical lenses of FIG. 6.

Each system shown in the accompanying drawings is of a radiation-utilising measurement system, including a planar, specular reflector capable of rotation about an axis, a fixed point source of a narrow beam of collimated radiation; or of a conically divergent beam of radiation, having a section with an apex angle less than, say, 45°, only such a conical beam being illustrated; the beam being arranged to be capable of being incident upon the rotatable reflector, and the system also including a fixed point detector of such radiation, the detector being arranged to be capable of receiving radiation after reflection by the reflector.

Each system comprises an operational system, such as an optical scanner, modified for an initial calibrating mode, before being rendered capable of performing its required function. In the initial calibrating mode the predetermined angular location of the reflector about the rotational axis, and relative to a datum angular location, is to be determined.

Further, in known forms of such systems, the rotatable reflector is likely to, or is arranged to, fluctuate about an axis considered to be in the plane at right angles to the rotational axis and including the source and the detector.

There is shown in FIG. 1 a sectional elevation of a rotatable member having a plurality of constituent reflectors 10. The member rotates about an axis 12, which comprises the rotational axis of each constituent reflector 10. Different reflectors 10 are inclined at different angles to the rotational axis 12, in order that the reflected portion of the conically shaped beam sweeps generally parallel to the line 13 (shown in FIG. 4), including the source 14 and the detector 15, (both also shown in FIG. 4), with a raster scanning action. Such a combination of a plurality of reflectors can be considered to be a single reflector, because, for any angular location of the rotatable member about the axis of rotation 12, only one constituent reflector is capable of reflecting radiation from the source to be received by the detector. In addition, as the member rotates, it can be considered that the single reflector 10 rotates, and fluctuates about an axis in the plane at right angles to the rotational axis 12 and including the source and the detector. Such fluctuation occurs because of the different angles of inclination to the rotational axis 12 of the different reflectors of the plurality of constituent reflectors.

Alternatively, fluctuation of a reflector about an axis considered to be in the plane at right angles to the rotational axis, and including the source and the detector, may occur inherently because of the rotation of the reflector.

For convenience, a known system, and having at least what can be considered to be a single reflector, will now be described in relation to fluctuation of the reflector.

FIG. 2 shows the arrangement of the system in a plane including the rotational axis 12, (not indicated in FIG. 2). The Figure also shows the line 13 including the point source 14, although the source is displaced from the illustrated plane, and the source masks the point detector with which it is in alignment, the detector also being displaced from the illustrated plane. The axis of fluctuation of the reflector 10 is indicated at 16. The axis of fluctuation 16 does not extend in the plane of the reflector 10, but intersects the reflector at the illustrated plane including the rotational axis 12. In relation to the fluctuation of the reflector 10, only the cross-section of the reflector in the plane illustrated in FIG. 2 need be considered, and it is immaterial in this respect whether the reflector is inclined to the axis of fluctuation 16, or not.

An optic axis is indicated by the dotted line 17, and is the normal from the axis of fluctuation 16 in the illustrated plane, and is equidistant from the source 14 and the detector. This is considered to be the optic axis of the system.

The axis of fluctuation 16 of a reflector, whilst intersecting the reflector 10, need not intersect the reflector at the plane including the rotational axis and the optic axis 17, but in any event can be considered so to intersect the reflector, in particular, at the point where the optic axis of the system intersects the reflector.

In addition, the axis of fluctuation 16 of the reflector may extend in the plane of the reflector.

The illustrated boundaries of the conical beam portions in the plane shown in FIG. 2, and incident upon the reflector 10, are indicated at 18 and 19, and, respectively, by one arrow, and two arrows.

Figure 2C:
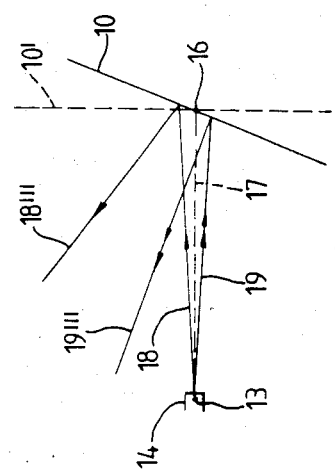
Figure 2A:
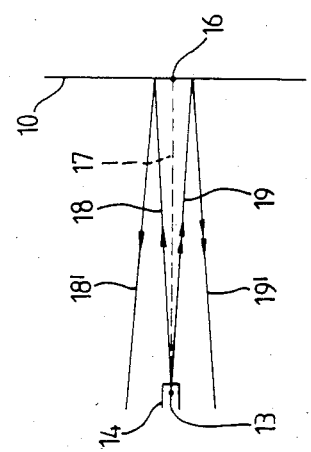
Figure 2B:
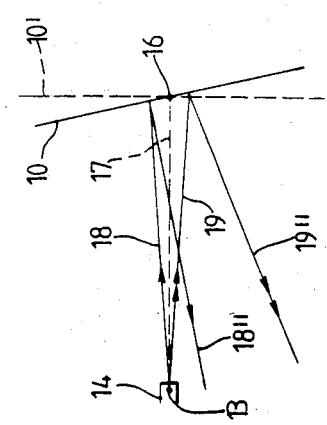

In FIG. 2a is shown the system when there is no fluctuation of the reflector 10, and FIGS. 2b and 2c are when the reflector fluctuates in both directions in relation to its position in FIG. 2a, this position of the reflector being indicated by a dotted line 10' in both FIGS. 2b and 2c. The same conical beam portion incident upon the reflector 10 is shown in each of FIGS. 2a, 2b and 2c, but the boundaries in the illustrated plane of the corresponding beam portion reflected from the reflector are indicated, respectively, at 18', 19'; 18'', 19''; and 18''' and 19''' . In FIG. 2a the boundaries 18' and 19' of the beam portion reflected from the reflector are equidistant from the detector at the line 13. As the reflector fluctuates, in either direction from the position shown in FIG. 2a, the reflected radiation is displaced away from the detector, as shown in FIGS. 2b and 2c. Further, with the reflector in the position shown in FIGS. 2b and 2c no reflected radiation is detected by the detector.

Measurements required to be made by the system comprise indicating when the rotatable reflector is in a predetermined angular location, and relative to a datum angular location, about the rotational axis.

In particular, the predetermined angular location, about the rotational axis 12, is when the projection of the line 13 on the reflector 10 is parallel with the line 13, and when the detector is capable of detecting the maximum possible intensity of the reflected radiation. This predetermined angular location is determined relative to the fixed positions of the point source and the point detector, and considered as defining a datum angular location about the axis of rotation. The predetermined angular location is determined, from measurements made by the system, in any known way.

The accuracy associated with the measurements required to be made by the system is reduced because of the reflector fluctuation, if the reflector fluctuation causes the reflected radiation to be at least partially displaced from the detector.

Figure 3A:
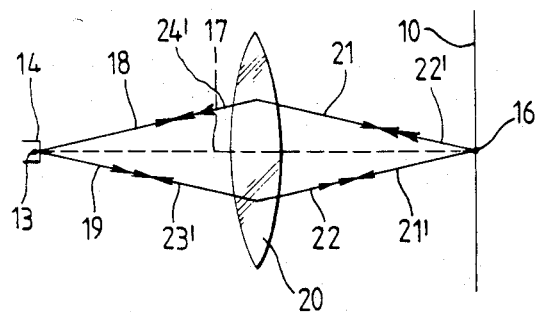
Figure 3B:
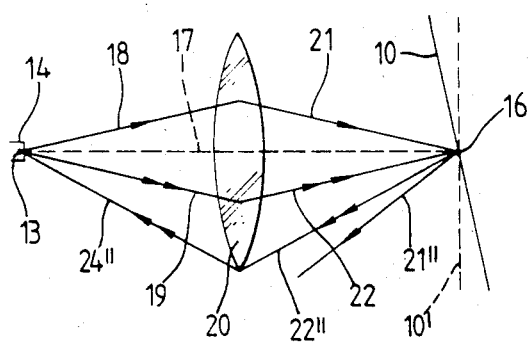
Figure 3C:
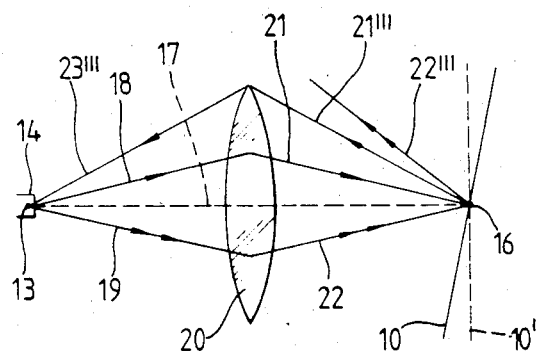

The arrangement of the system shown in FIG. 3, comprising an embodiment in accordance with the present invention, and including a refracting arrangement, is to compensate for the effects upon the accuracy associated with the measurements required to be made by the system, caused by the reflector fluctuation. FIG. 3 corresponds to FIG. 2, the illustrated plane including the rotational axis 12 (not shown in FIG. 3), and the optic axis 17. Apart from the inclusion of the refracting arrangement, the system shown in FIG. 3 is the same as that shown in FIG. 2. In FIG. 3a the system arrangement is shown when there is no fluctuation of the reflector 10. FIGS. 3b and 3c are when the reflector fluctuates in both directions from the position shown in FIG. 3a. The position of the reflector when there is no reflector fluctuation is indicated by a dotted line 10' in both FIGS. 3b and 3c.

The refracting arrangememt provided comprises a single thin refracting element, in the form of a bi-cylindrical lens 20, the axes of curvature (not shown), of the two part-cylindrical surfaces of the lens extending parallel to the axis of fluctuation 16 of the reflector, and the optic axis of the lens being coincident with the optic axis 17 of the system. The reciprocal of the distance of the lens 20 from the source 14, plus the reciprocal of the distance of the lens 20 from the reflector 10, is equal to the reciprocal of the focal length of the lens 20 in the illustrated plane, in which plane the lens 20 has a positive power. Hence, the radiation from the source 14 is focussed into a line on the reflector, and at right angles to the rotational axis; and radiation reflected from the reflector is focussed into a line at least substantially coincident with the line 13 including the source and the detector, irrespective of any reflector fluctuation.

The illustrated boundaries of the conical beam portion in the plane shown in FIG. 3, and supplied from the source 14, are indicated at 18 and 19, and, respectively, by one arrow, and two arrows. The same such conical beam portion is shown in each of FIGS. 3a, 3b and 3c. The boundaries in the illustrated plane of the corresponding beam portion transmitted by the lens 20, and brought to a line focus on the reflector, are indicated at 21 and 22, respectively. In FIGS. 3a, 3b and 3c, the boundaries of the corresponding beam portion reflected from the reflector are indicated, respectively, at 21' 22'; 21'', 22''; and 21''' and 22'''.

The reflected portion of the beam is focussed by the lens 20 into a line at least substantially coincident with the line 13 including the source 14 and the detector, irrespective of any reflector fluctuation. In FIG. 3a the boundaries in the illustrated plane of these beam portions are indicated at 23', 24'. With the reflector in the positions shown in FIGS. 3b and 3c, reflector fluctuation is at the extremities so that radiation is just detected by the detector. In FIG. 3b the beam boundary 24'' correspondign to the beam boundary 22'' is shown; but the beam boundary 21'' is not transmitted by the lens 20, and so a corresponding beam boundary thereto is not indicated. Similarly, in FIG. 3c the beam boundary 23''' corresponding to the beam boundary 21''' is shown; but the beam boundary 22''' is not transmitted by the lens 20, and so a corresponding beam boundary thereto is not indicated.

Because the reflected radiation is focussed into a line, at least substantially, coincident with the line 13 extending between the source 14 and the detector, the effects of reflector fluctuation are obviated.

Further, because the reflected radiation is focussed into a line, at least substantially, coincident with the line 13 extending between the source 14 and the detector, the system is also such that the effects in the corresponding known system of the reflected beam portion having a finite length at right angles to the line 13, as shown in FIG. 2, are obviated, and the accurate determination of the predetermined angular location of the reflector 10, about the axis of rotation 12, when the maximum possible intensity of the reflected radiation is capable of being detected by the detector, thereby is facilitated.

It is not essential that a point detector is provided in the plane at right angles to the rotational axis of the reflector, and including the source and the detector, but only that what can be considered to be such a point detector is provided. Thus, the point detector can be considered to be the normal projection of a provided point detector onto the plane. If a detector of a finite sensitive area is provided, which detector is intersected by the plane, the considered point detector, respectively, is the point, or the point of symmetry, of the detector within the plane. Ideally, the detector is as small as is practicable. Alternatively, and whether the detector of a finite sensitive area is intersected by the plane, or not, the considered point detector may be the normal projection onto the plane of the point of the provided detector at which the maximum radiation intensity is detected, when the projection of the line including the source and the considered point detector onto the reflector is parallel to the line. More than one detector may be provided, the arrangement being such that; either at any instant only one detector, comprising, or considered to be, a point detector, is operable; or a point in the plane about which the provided detectors are symmetrical, or the normal projection of the symmetrical point of the provided detectors onto the plane, can be considered to be the point detector in the plane.

Thus, in one particular arrangement of FIG. 3, instead of a single point detector being provided, two detectors are provided, spaced apart along the line including the point source, and what is considered to be the point detector, the considered point detector comprising the point midway between the two provided detectors. The predetermined angular location of the reflector about the rotational axis is detected by the arrangement being such that both provided detectors either only detect incident radiation simultaneously, or only detect the same intensity of incident radiation simultaneously, when the reflector is in its predetermined angular location.

Alternatively, the point source 14 may provide a narrow collimated beam of radiation, for example, the source 14 comprising a laser, and the lens 20 causes a spot to be produced on the line 13. Hence, a point detector conveniently can be provided on the line 13.

FIG. 4 also shows the known form of the radiation-utilising system of FIG. 2, the source 14 providing a conically divergent beam of radiation, and the system having a planar reflector 10 rotatable about an axis 12. However, FIG. 4 shows the arrangement of the system in the plane at right angles to the rotational axis 12, and the plane including the line 13 extending between a fixed point source 14 and the fixed point detector 15. The rotational axis 12 does not extend in the plane of the reflector 10, but is considered as intersecting the reflector at the illustrated plane including the source 14 and the detector 15. In relation to the rotation of the reflector 10, only the cross-section of the reflector in the plane illustrated in FIG. 4 need be considered, and it is immaterial in this respect whether the reflector is inclined to the rotational axis 12 of the reflector, or not.

Irrespective of any inclination of the reflector to the axis of rotation of the reflector, the rotational axis of the reflector need not intersect the reflector at the plane both at right angles to the rotational axis and including the source and the detector, but in any event can be considered so to intersect the reflector, in particular, at the point where the optic axis of the system intersects the reflector.

Further, the rotational axis of the reflector may extend in the plane of the reflector, or parallel thereto.

The illustrated boundaries of the conical beam portions in the plane shown in FIG. 4, and incident upon the reflector 10, are indicated at 32 and 33, and, respectively, by one arrow, and two arrows.

Figure 4A:
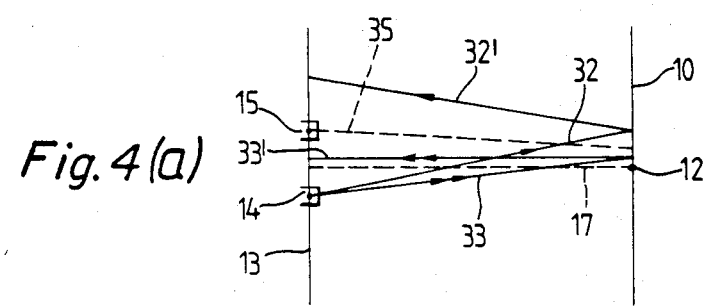
Figure 4B:
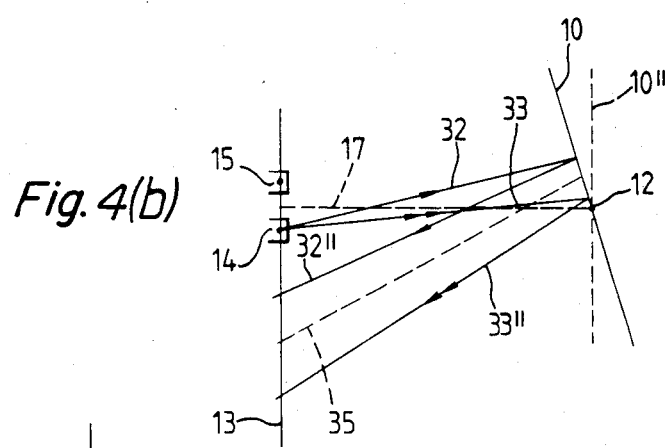
Figure 4C:
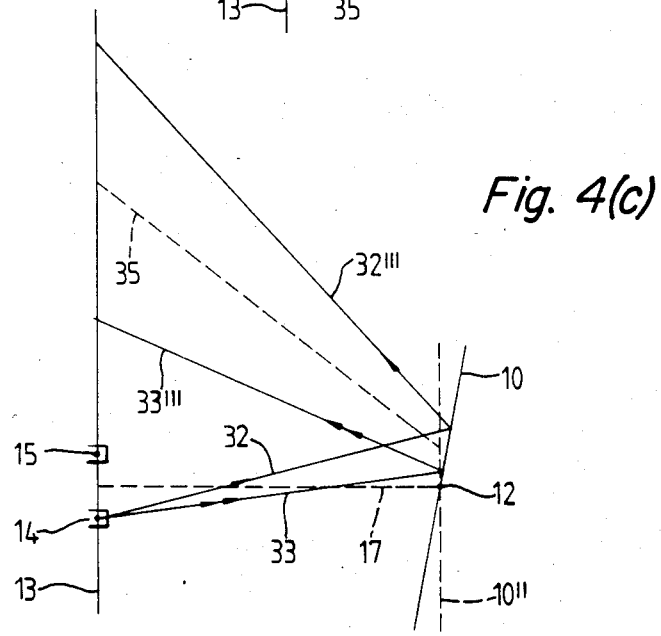

In FIG. 4a is shown the system when the projection of the line 13 on the reflector 10 is parallel with the line 13, and FIGS. 4b and 4c are when the reflector is rotated in both directions from the angular location shown in FIG. 4a. The angular location of the reflector in FIG. 4a, comprising the predetermined angular location about the axis of rotation 12, is indicated by a dotted line 10" in both FIGS. 4b and 4c. The same conical beam portion incident upon the reflector is shown in each of FIGS. 4a, 4b, and 4c, but the boundaries in the illustrated plane of the corresponding beam portion reflected from the reflector are indicated, respectively, at 32', 33'; 32", 33"; and 32"' and 33"'. In FIG. 4a the boundaries 32' and 33' of the beam portion reflected from the reflector are equidistant from the detector 15 at the line 13 including the source and detector. The axis of the reflected portion of the conically shaped beam is the path of the part of the reflected radiation which is received by the point detector 15, and is indicated by the dotted line 35. As the reflector 10 rotates, in either direction from the predetermined angular location shown in FIG. 4a, the reflected radiation sweeps at least generally along the line 13 including the source 14 and the detector 15, and away from the detector 15, as shown in FIGS. 4b and 4c. Further, with the reflector in the angular locations shown in FIGS. 4b and 4c no reflected radiation is detected by the detector.

The accuracy associated with the measurements required to be made by the system about the axis of rotation, when the reflected beam portion is unmodified, as shown in FIG. 4, is reduced because the conical reflected beam portion has a substantial finite length along the line including the source and the detector, as shown in FIG. 4, and even when the apex angle of the section of the conically divergent beam of radiation is small.

However, the system described above in relation to FIG. 4, can be modified by including a refracting arrangement, so that there is provided compensation for the otherwise adverse effects upon the accuracy associated with the measurements required to be made by the system, caused by the reflected portion of the radiation beam having a finite length sweeping at least generally along the line 13 including the source 14 and the detector 15.

Figure 5A:
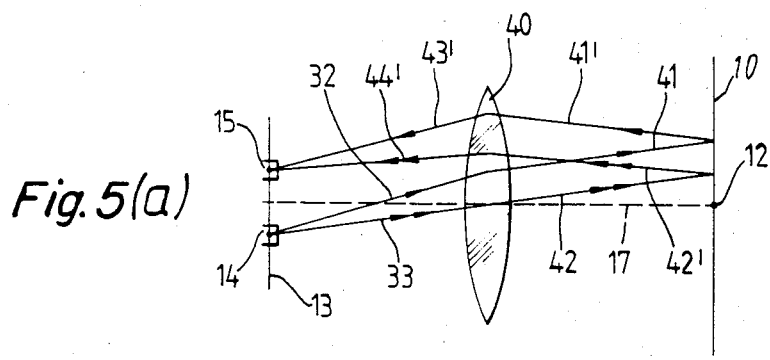
Figure 5B:
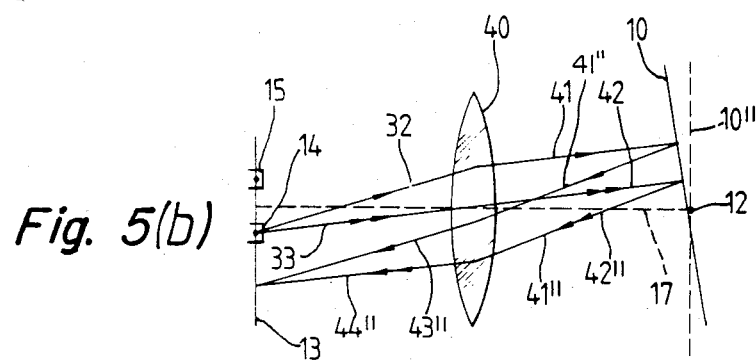
Figure 5C:
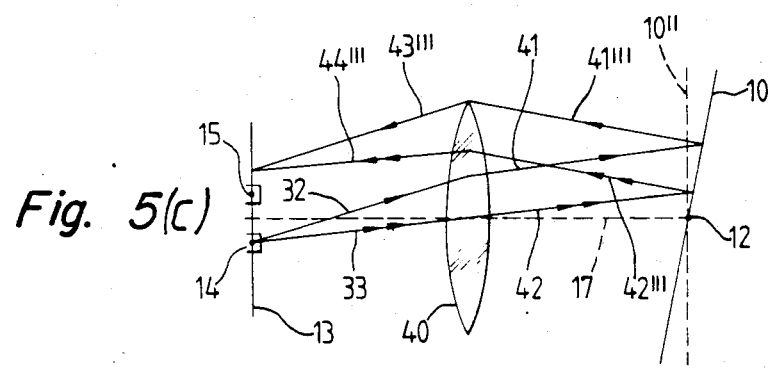

The arrangement of the system including such a refracting arrangement, is shown in FIG. 5. FIG. 5 corresponds to FIG. 4, the illustrated plane both being at right angles to the rotational axis 12 and including the source 14 and the detector 15. Apart from the inclusion of the refracting arrangement, the system shown in FIG. 5 is the system shown in FIG. 4. In FIG. 5a the system arrangement is shown when the reflector is in the predetermined angular location 10" about the rotational axis, and in FIGS. 5b and 5c are shown the arrangement when the reflector is rotated in both directions in relation to its predetermined angular location.

The refracting arrangement provided comprises a single thin refracting element, in the form of a bi-cylindrical lens 40, the axes of curvature (not shown), of the two part-cylindrical surfaces of the lens extending parallel to the axis of rotation 12, and the optic axis of the lens being coincident with the optic axis 17 of the system. The source 14 is spaced from the lens 40 by a distance equal to the focal length of the lens in the illustrated plane, in which plane the lens 40 has a positive power. Hence, collimated radiation is both incident upon, and reflected from, the reflector 10 in the illustrated plane.

The illustrated boundaries of the conical beam portions in the plane shown in FIG. 5, and suppied from the source 14, are indicated at 32 and 33, and, respectively, by one arrow, and two arrows. The same such conical beam portion is shown in each of FIGS. 5a, 5b and 5c. The boundaries in the illustrated plane of the corresponding collimated beam portion incident upon the reflector are indicated at 41 and 42, respectively. In FIG. 5a, 5b and 5c, the boundaries of the corresponding collimated beam portion reflected from the reflector are indicated, respectively, at 41', 42'; 41'', 42''; and 41''' and 42'''.

The reflected portion of the beam is focussed by the lens 40 into a line at right angles to the line 13 including the source 14 and the detector 15, and in FIGS. 5a, 5b and 5c, the boundaries in the illustrated plane of these beam portions are indicated, respectively at 43', 44'; 43'', 44''; and 43''' and 44'''. When the reflector is in its predetermined angular location, as shown in FIG. 5a, the reflected radiation is focussed into a line coincident with the detector 15. Otherwise the reflected radiation is focussed into a line, capable of moving along, at least substantially, the line 13 extending between the source 14 and the detector 15, but the line focus being spaced from the detector 15. The effective point of rotation of the line focus is the centre of the lens 40.

Because the reflected radiation is focussed into a line, at the line 13 extending between the source 14 and the detector 15, the system obviates the effects of the otherwise conical reflected beam portion having a substantial finite length along the line 13.

Further, because the reflector fluctuation is superimposed upon reflector rotation, in accordance with a further embodiment of the present invention, and when the point source 14 provides a conically divergent beam of radiation, the arrangements of the systems shown in FIGS. 3 and 5, in another embodiment in accordance with the present invention, are combined, to obviate for the effects caused by the reflector fluctuation, and the effects caused by the conical reflected beam portion having a finite length along the line including the source and the detector, (and at right angles thereto). Measurements required to be made by the system comprise indicating when the rotatable reflector is in a predetermined angular location, and relative to a datum angular location, about the rotational axis. In particular, the predetermined angular location 10'' of FIGS. 4b and 4c, about the rotational axis 12, when the projection of the line 13 including the source 14 and the detector 15 on the reflector 10 is parallel with the line 13, as shown in FIG. 4a, is when the detector detects the maximum possible intensity of the reflected radiation.

In FIGS. 6a, 6b and 6c is shown the arrangement of such a system in the plane including the rotational axis 12 and the optic axis 17. In FIG. 6a the system arrangement is shown when there is no fluctuation of the reflector 10. FIGS. 6b and 6c are when the reflector fluctuates in both directions from the position shown in FIG. 6a. The position of the reflector when there is no reflector fluctuation is indicated by a dotted line 10' in both FIGS. 6b and 6c. The lens 40 has no effect in the illustrated plane, having zero power in this plane. Otherwise these Figures correspond to FIGS. 3a, 3b and 3c, and in the illustrated plane the system operates in a similar manner to the system of FIG. 3.

In FIGS. 6d, 6e and 6f is shown the arrangement of the system in the plane at right angles to the rotational axis 12 and including the source 14 and the detector 15.

In FIG. 6d the system arrangement is shown when the reflector 10 is in the predetermined angular location about the rotational axis, and in FIGS. 6e and 6f is shown the arrangement when the reflector is rotated in both directions in relation to its predetermined angular location 10''. The lens 20 has no effect in the illustrated plane, having zero power in this plane. Otherwise these Figures correspond to FIGS. 5a, 5b and 5c, and in the illustrated plane the system operates in a similar manner to the system of FIG. 5.

The boundaries of the constituent beam portions are indicated by the same reference numerals in FIG. 6 as in the corresponding FIGS. 3 and 5. However, with the system arrangement of FIG. 6, the reflected radiation is focussed into a spot, at least substantially, coincident with the line 13 extending between the source 14 and the detector 15, and the spot is displaceable along the line 13. Thus, the system is capable of determining accurately the predetermined angular location of the reflector 10'', about the rotational axis 12, as shown in FIG. 6d, when the maximum possible intensity of the reflected radiation is detected by the detector.

The lens 20 of FIG. 3, or the lens 40 of FIG. 5, may comprise a plano-cylindrical lens.

With either the system of FIG. 3, or the system of FIG. 6, the lens, or lenses, provided determines the size of the apex angle of the section of the conically divergent beam of radiation considered to be provided by the source. Thus, the system may include a point source with radiation being emitted over a substantial solid angle therefrom, but, for example, only the radiation transmitted by the lens in both directions is considered to be provided. Further, the provided beam can be considered to be that transmitted by only a part of the lens, when the reflector is in its predetermined angular location, but the considered part being sufficient for the system to be capable of detecting the predetermined angular location. Radiation from the source, and/or reflected radiation, and not transmitted by the lens, may be ignored. If very large fluctuations of the reflector are possible a large diameter lens 20 is required, and/or the lens 20 is required to be close to the reflector, otherwise it may not be possible to focus the reflected radiation onto the detector when the required measurements are to be made.

As shown in FIG. 7, the two lenses 20 and 40 of FIG. 6 may be combined into a single thin refracting element, comprising a lens 50, having two part-cylindrical surfaces 51 and 52, the axes of curvature of these surfaces being at right angles to each other.

Conveniently, but not essentially, the focal length of the lens 20, or the equivalent thereof, for example, as shown in FIG. 7, is half the focal length of the lens 40, or the equivalent thereof. Thus, when the lens 20, or the lens 50, is spaced from the source 14, and from the reflector 10, by a distance equal to twice the focal length of the lens 20, or the equivalent thereof, the system is as compact as possible.

Because the focal length of the lens 20, or the equivalent thereof, for example, as shown in FIG. 7, usually differs from the focal length of the lens 40, or the equivalent thereof, the refracting arrangement of FIG. 6 may comprise, or be equivalent to, a plano-spherical, or bi-spherical, lens, in combination with a plano-cylindrical, or a bi-cylindrical, lens, the sum of the powers of the lenses in the plane at right angles to the rotational axis 12 and including the source 14 and the detector 15, and the sum of the powers of the lenses in the plane including the rotational axis 12 and the optic axis 17, both having the required values, the cylindrical lens possibly having a negative power. Conveniently, such a refracting arrangement comprises a single thin lens, such as that shown in FIG. 7, but with one part-spherical surface, and one part-cylindrical surface.

Instead of the system comprising an operational system modified for an initial calibrating mode, the system may be an unmodified operational system. In one such arrangement, successive determinations of the predetermined angular location of the reflector, about the rotational axis, are employed to determine the speed of rotation of the reflector, possibly the system being included in apparatus having a gyroscope, the reflector being mounted on the gryoscope, and the rotational speed of the gyroscope being determined.

What we claim is:

1. A radiation-utilising measurement system including a planar, specular rotatable reflector having an axis of rotation and being capable of rotation about said axis, a fixed source of a beam of radiation, and a fixed point detector, the arrangement being such that the beam is capable of being incident upon the rotatable reflector, and the detector being capable of receiving radiation after reflection by the reflector, there being a plane at right angles to the axis of rotation of the reflector and including the source and the detector, the plane also including the optic axis of the system extending equidistant between the source and the detector, and there being a plane including the axis of rotation of the reflector and the optic axis, the system having a refracting arrangement with an optic axis coincident with the optic axis of the system to transmit both the beam of radiation incident upon the reflector, and the reflected beam of radiation incident upon the detector, and the refracting arrangement at least includes a thin refracting element, having zero power in the plane at right angles to the axis of rotation of the reflector and including the source and the detector, and in this plane a collimated beam portion is arranged to be incident upon the reflector, and the system is arranged so that the reciprocal of the distance of the refracting element from the source, plus the reciprocal of the distance of the refracting element from the reflector, is equal to the reciprocal of the focal length of the refracting element in the plane including the axis of rotation of the reflector and the optic axis, in which latter plane the refracting element has a positive power.

2. A system as claimed in claim 1 having the point source arranged to provide a conically divergent beam of radiation, and the refracting arrangement also includes a thin refracting element having zero power in the plane including the axis of rotation of the reflector and the optic axis, and the system is arranged so that the source is spaced from the refracting arrangement by a distance equal to the focal length of the refracting arrangement in the plane both at right angles to the axis of rotation of the reflector and including the source and the detector, in which latter plane the refracting arrangement has a positive power.

3. A system as claimed in claim 2 wherein the refracting arrangement has the equivalent of two discrete thin refracting elements, the combination being in the form of a single thin lens with two part-cylindrical surfaces, the axis of curvature of these surfaces being at right angles to each other.

4. A system as claimed in claim 2, wherein the refracting arrangement has the equivalent of a combination of two, discrete thin refracting elements, the combination being in the form of a single thin lens, with one part-spherical surface, and one part-cylindrical surface.

5. A system as claimed in claim 2, the focal length of the refracting element, in the plane including both the axis of rotation of the reflector and the optic axis, being half the focal length of the refracting element in the plane both at right angles to the rotational axis and including the source and the detector, and the refracting arrangement is positioned mid-way between the source and the detector, and the reflector.

* * * * *